United States Patent
Akiyama

(10) Patent No.: US 7,859,750 B2
(45) Date of Patent: Dec. 28, 2010

(54) SCREEN, PROJECTION SYSTEM, AND METHOD OF MANUFACTURING THE SCREEN

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 200 days.

(21) Appl. No.: 12/356,711

(22) Filed: Jan. 21, 2009

(65) Prior Publication Data
US 2009/0225417 A1    Sep. 10, 2009

(30) Foreign Application Priority Data
Mar. 5, 2008    (JP) .............................. 2008-054463

(51) Int. Cl.
*G03B 21/60* (2006.01)
(52) U.S. Cl. ...................... 359/454; 359/459; 359/900
(58) Field of Classification Search ................ 359/443, 359/449, 454–457, 459, 900
See application file for complete search history.

(56) References Cited

U.S. PATENT DOCUMENTS

| | | | | |
|---|---|---|---|---|
| 3,704,055 A | * | 11/1972 | Hong ........................... | 359/459 |
| 3,893,748 A | * | 7/1975 | De Palma et al. ............ | 359/459 |
| 4,206,969 A | * | 6/1980 | Cobb et al. .................. | 359/459 |
| 4,911,529 A | * | 3/1990 | Van De Ven ................. | 359/459 |
| 5,096,278 A | * | 3/1992 | Yoshioka et al. ............. | 359/459 |
| 7,457,036 B2 | * | 11/2008 | Wood ........................... | 359/454 |
| 7,667,893 B2 | * | 2/2010 | Peterson et al. .............. | 359/459 |
| 7,715,098 B1 | * | 5/2010 | Sweatt ......................... | 359/459 |
| 2009/0046361 A1 | * | 2/2009 | Itoh et al. .................... | 359/459 |
| 2009/0207488 A1 | * | 8/2009 | Akiyama ...................... | 359/455 |

FOREIGN PATENT DOCUMENTS

| | | |
|---|---|---|
| JP | A-2-71240 | 3/1990 |
| JP | A-3-156435 | 7/1991 |
| JP | A-5-72631 | 3/1993 |
| JP | B2-2-3033853 | 4/2000 |
| JP | A-2002-23271 | 1/2002 |
| JP | A-2005-17894 | 1/2005 |

* cited by examiner

*Primary Examiner*—Christopher Mahoney
(74) *Attorney, Agent, or Firm*—Oliff & Berridge, PLC

(57) ABSTRACT

A screen includes a front surface structure section including a lens array having a plurality of element lenses arranged on a two-dimensional plane on a front side of the screen, a rear surface structure section including a plurality of scattering surfaces formed on a rear side of the lens array so as to be tilted with respect to the two-dimensional plane, and adapted to emit projection light, which has been input, towards the front side of the screen while scattering the projection light, and an adhesive layer adapted to bond the front surface structure section and the rear surface structure section to each other, and the rear surface structure section is composed mainly of a plurality of rear surface forming sections different from each other in a pattern of the plurality of scattering surfaces.

13 Claims, 8 Drawing Sheets

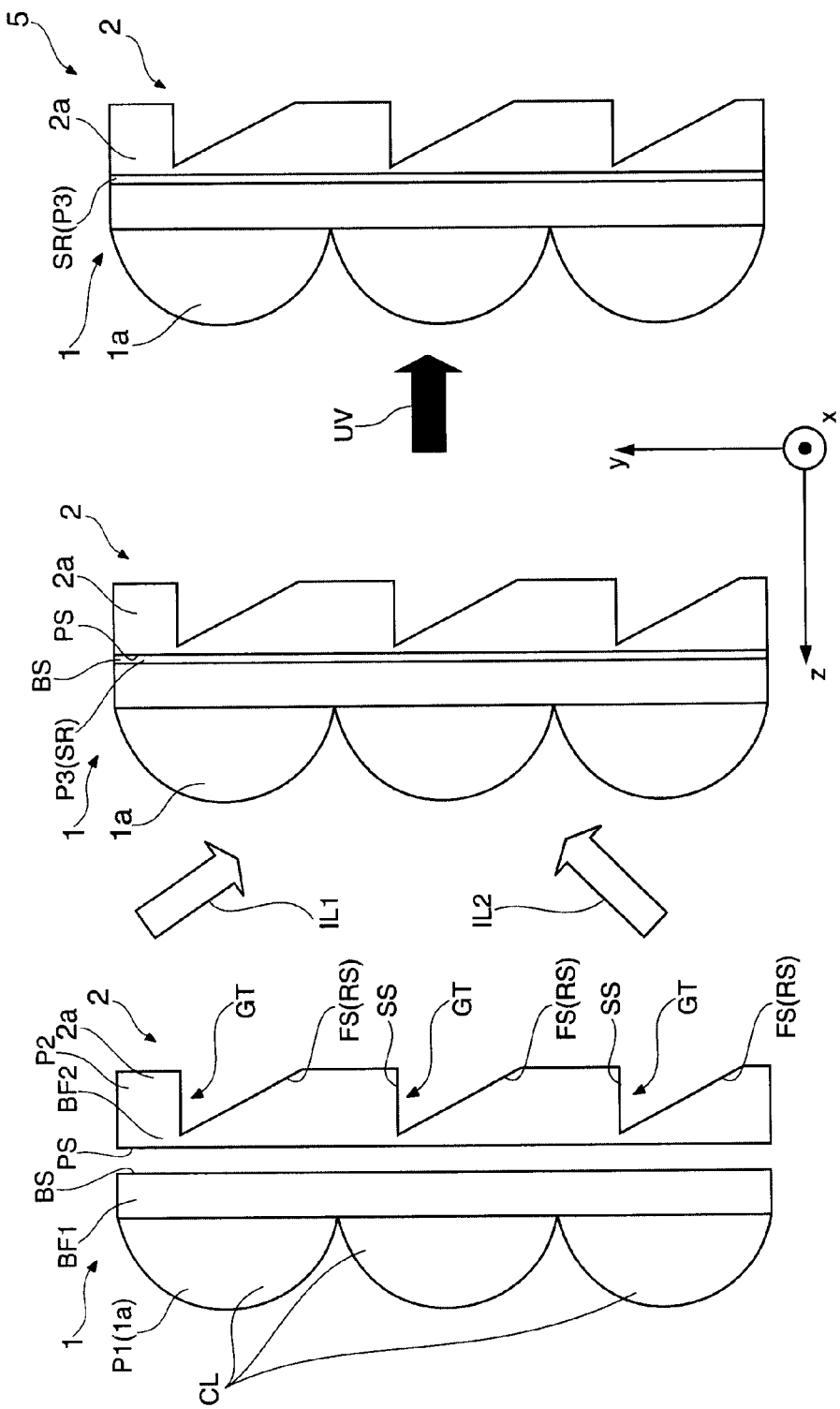

SCREEN, PROJECTION SYSTEM, AND METHOD OF MANUFACTURING THE SCREEN

BACKGROUND

1. Technical Field

The present invention relates to a screen reflecting projection light from a projection device such as a projector disposed in front of the screen, thereby displaying a projection image, a projection system using the screen, and a method of manufacturing the screen.

2. Related Art

There is known a screen using a material obtained by accumulating microlenses and a reflecting plane with each other and having a direction of the reflecting plane disposed behind the microlenses tilted towards the center normal line of the screen, and in particular a screen having the tilt angle of the reflecting plane varying gradually from the center section of the screen towards the peripheral area thereof (see JP-A-3-156435). The screen is integrally formed by, for example, extrusion roll forming (see JP-A-3-156435 mentioned above).

However, in the reflective screen reflecting projection light from a projection device such as a projector disposed in front thereof, thereby displaying a projection image, in the case of having a structure in which the tilt angle of the reflecting plane varies gradually from the center section of the screen towards the peripheral area thereof, there is a possibility that it becomes difficult to integrally form the reflecting plane particularly while varying the tilt angle appropriately. Further, in the case of forming a large sized screen, there is a possibility that simple extrusion roll forming costs much. Further, it is possible to form a large sized screen by joining some partial screens with each other, and in this case, there is a possibility that the joints between the partial screens become conspicuous.

Further, as another problem, when using the reflective screen, there is a possibility that apart of outside light, which is unwanted light, is reflected towards a location of the observer of the screen, there is a possibility that the outside light thus reflected becomes a cause of lowering the contrast of the projected image.

SUMMARY

Therefore, an advantage of some aspect of the invention is to provide a screen capable of reducing the influence of the outside light to improve the contrast of the projection image in a bright room or the like, and appropriately reflecting and scattering the projection light with a deep incident angle towards the front of the screen, and further relatively easy to manufacture at low cost, a projection system using the screen, and a method of manufacturing the screen.

In view of the above problems, a screen according to an aspect of the invention includes a front surface structure section including a lens array having a plurality of element lenses arranged on a two-dimensional plane on a front side of the screen, a rear surface structure section including a plurality of scattering surfaces formed on a rear side of the lens array so as to be tilted with respect to the two-dimensional plane, and adapted to emit projection light, which has been input, towards the front side of the screen while scattering the projection light, and an adhesive layer adapted to bond the front surface structure section and the rear surface structure section to each other, and the rear surface structure section is composed mainly of a plurality of rear surface forming sections different from each other in a pattern of the plurality of scattering surfaces.

Firstly, in the screen described above, by disposing the scattering surface, which is tilted with respect to the plane having the lens array arranged thereon and reflects the projection light transmitted through the element lenses while scattering the projection light, on the rear side of each of the element lenses constituting the lens array, it is possible to emit the projection light, which has been input to the screen, towards the front of the element lenses in a condition of being appropriately scattered. On this occasion, by forming the rear surface structure section with a plurality of rear surface forming sections having different patterns of a plurality of scattering surfaces from each other, it is possible to appropriately reflect and/or scatter, diffuse the projection light frontward in accordance with the incident angle of the projection light, which varies depending on the incident position.

Further, according to another specific aspect of the invention, the front surface structure section is an integral molding component. In this case, the front side of the screen can easily be made seamless and to have sufficient strength.

Further, according to another specific aspect of the invention, the adhesive layer is made of ultraviolet curing resin. Specifically, the adhesive layer is cured by the application of the ultraviolet ray, thereby bonding the front surface structure section and the plurality of rear surface forming sections to each other. In this case, by performing the alignment of the plurality of rear surface forming sections with respect to the front surface structure section, and subsequently bonding the front surface structure section and the rear surface forming sections to each other, the operations of alignment and bonding can easily be executed.

Further, according to another specific aspect of the invention, the lens array includes a plurality of cylindrical lenses as the plurality of element lenses, and is formed of a lenticular lens having the plurality of cylindrical lenses arranged in a direction perpendicular to a longitudinal direction of each of the cylindrical lenses in the plane of screen. In this case, by using the lenticular lens as the lens array, the screen can be manufactured with simplicity and easiness.

Further, according to another specific aspect of the invention, the plurality of rear surface forming sections is arranged so as to be joined with each other to cover a rear side of the front surface structure section, and a seam of the plurality of rear surface forming sections extends along a longitudinal direction of the plurality of cylindrical lenses. In this case, the seams of the plurality of rear surface forming sections become inconspicuous.

Further, according to another specific aspect of the invention, the screen further contains a light absorption surface made of a light absorbing material disposed at least in a peripheral area of the scattering surface in a rear side of the rear surface structure section. In this case, it is possible to absorb the unnecessary light such as the outside light with the light absorption surface, thereby forming a high contrast image.

Further, according to another specific aspect of the invention, the lens array has an antireflection coat on a front surface of the lens array. Thus, the reflection on the surface of the screen can be prevented.

Further, according to another specific aspect of the invention, the lenticular lens is arranged to be roll-windable, and has a structure of arranging the plurality of cylindrical lenses so as to have a longitudinal direction along a direction of an axis around which the lenticular lens is rolled. According to this configuration, since the boundary sections between the cylindrical lenses mainly bend when retracting the screen by rolling, the amount of deformation of the main body section of the cylindrical lens can be reduced.

Further, a projection system according to still another specific aspect of the invention includes the screen according to either one of the aspects of the invention described above, and) an image projection device adapted to project a projection image on the screen. In this case, since the projection system uses the screen described above, the projection system can appropriately scatter and reflect the projection light, further utilize the projection light effectively, and also reduce the influence of the outside light, thereby improving the contrast of the projection image in a bright room or the like.

Further, a method of manufacturing a screen according to still another specific aspect of the invention includes the steps of (a) forming a front surface structure section including a lens array having a plurality of element lenses arranged on a two-dimensional plane on a front side of the screen, (b) forming a plurality of rear surface forming sections each including a plurality of scattering surfaces formed on a rear side of the lens array so as to be tilted with respect to the two-dimensional plane, and adapted to emit projection light, which has been input, towards the front side of the screen while scattering the projection light, and (c) bonding the front surface structure section formed in step (a) and the plurality of rear surface forming sections formed in step (b) to each other, (d) patterns of the plurality of scattering surfaces are different between the rear surface forming sections.

Firstly, according to the method of manufacturing a screen described above, each of the rear surface forming sections is individually fixed while executing the alignment thereof with respect to the corresponding element lens in the bonding step, namely the step (c). According to this configuration, since each of the rear surface forming sections having the patters of the scattering surfaces different from each other can be aligned individually at the optimum position, the screen manufactured by the method described above can appropriately reflect and scatter the projection light frontward in accordance with the incident angle of the projection light, which varies in accordance with the incident position of the projection light.

Further, according to another specific aspect of the invention, in step (a), the front surface structure section is formed as an integral molding component. In this case, the front side of the screen can easily be made seamless.

Further, according to another specific aspect of the invention, in step (c), positioning of the plurality of scattering surfaces corresponding to the plurality of element lenses is performed while applying imaginary light, which corresponds to light applied to the screen in actual use, from a front side of the front surface structure section, thereby performing an alignment of the plurality of rear surface forming sections, and then the plurality of rear surface forming sections is fixed to the front surface structure section. In this case, by using, for example, the light corresponding to the projection light from the projection device such as a projector or the light corresponding to the outside light as the unnecessary light, the plurality of scattering surfaces can respectively be positioned with respect to the plurality of element lenses so as to obtain the optimum contrast.

Further, according to another specific aspect of the invention, in step (c), an ultraviolet curing resin is held between the front surface structure section and the plurality of rear surface forming sections, and then an ultraviolet ray is applied to the ultraviolet curing resin, thereby bonding the front surface structure section and the plurality of rear surface forming sections to each other. In this case, by performing the alignment of the plurality of rear surface forming sections with respect to the front surface structure section, and subsequently applying an ultraviolet ray to the ultraviolet curing resin to bond the front surface structure section and the rear surface forming sections to each other, the operations of alignment and bonding can easily be executed.

BRIEF DESCRIPTION OF THE DRAWINGS

The invention will now be described with reference to the accompanying drawings, wherein like numbers reference like elements.

FIGS. 4A through 4C are diagrams for explaining a method of manufacturing the screen.

DESCRIPTION OF EXEMPLARY EMBODIMENTS

First Embodiment

Figure 1:
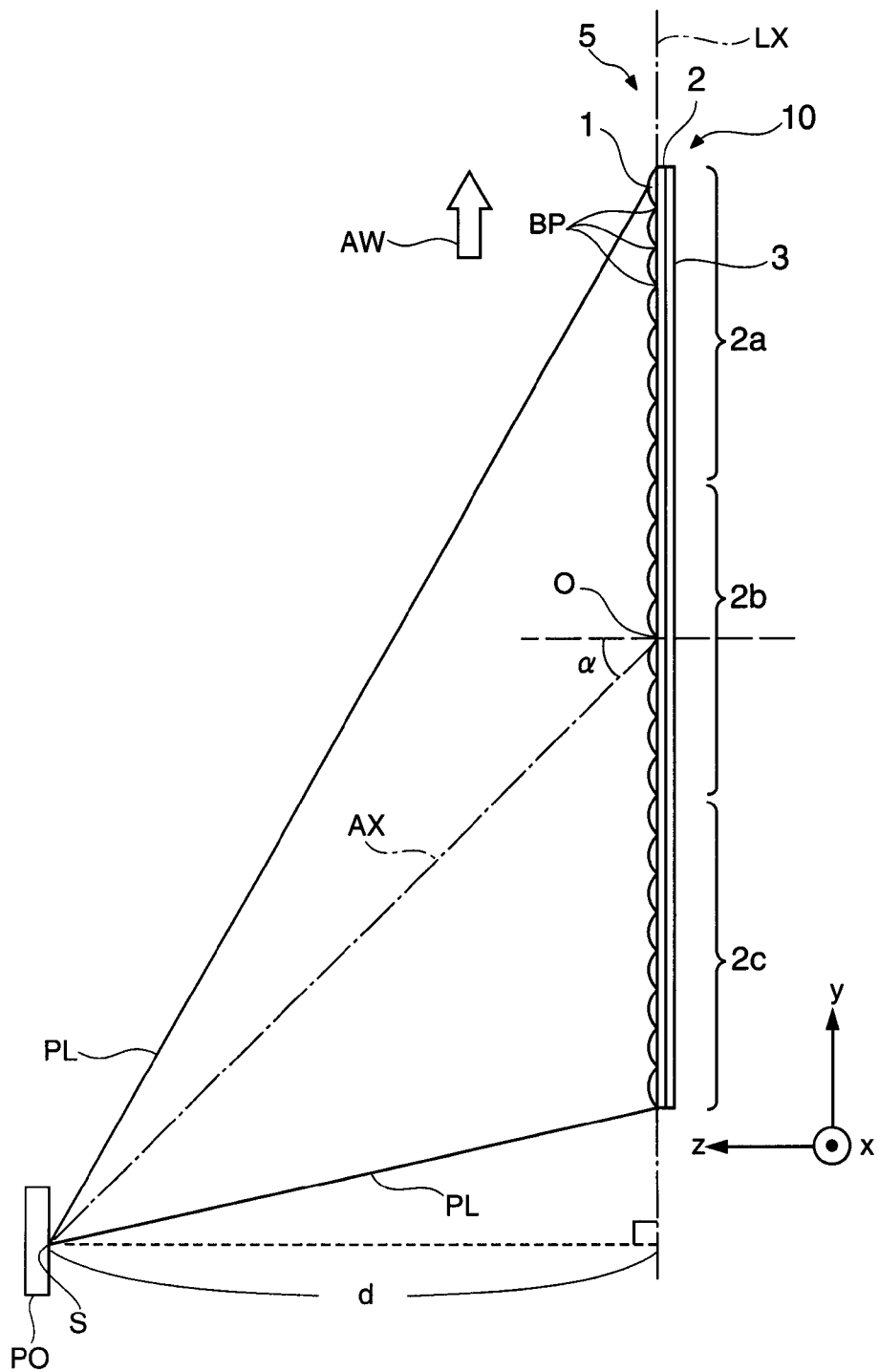
FIG. 1 is a side view schematically showing a screen according to a first embodiment.

A screen according to a first embodiment of the invention will hereinafter be explained with reference to the accompanying drawings. FIG. 1 is a side view schematically showing the screen according to the present embodiment. The screen 10 of the present embodiment is a reflective screen, and provided with a front surface structure section 1 having a light-transmissive property and forming the front side of the screen 10, a rear surface structure section 2 covering the entire rear side of the front surface structure section 1, and a light absorption sheet 3 attached to the entire rear side of the rear surface structure section 2. Among these constituents, the rear surface structure section 2 includes three rear surface forming sections 2a, 2b, and 2c disposed on the entire rear side of the front surface structure section 1 so as to divide the area of the front surface structure section 1. These three rear surface forming sections 2a, 2b, and 2c are arranged in a vertical direction of the screen 10, namely the y direction without substantial gaps.

As shown in the drawing, projection light PL is projected onto the screen 10 from a projection light source point S of a projection lens PO provided to, for example, a projection device, thus executing image projection. Here, the projection light source point S is implemented at a lower position adjacent to the screen 10, and the projection light PL is projected in a condition in which the distance between the projection light source point S and the screen 10 is a projection distance d. As a result, at the center position O located at the center of a screen center axis LX extending vertically at the horizontal center of the screen 10, the projection light PL from the projection light source point S enters upward from the lower position with the light beam axis AX having an incident angle α (alpha).

Figure 2:
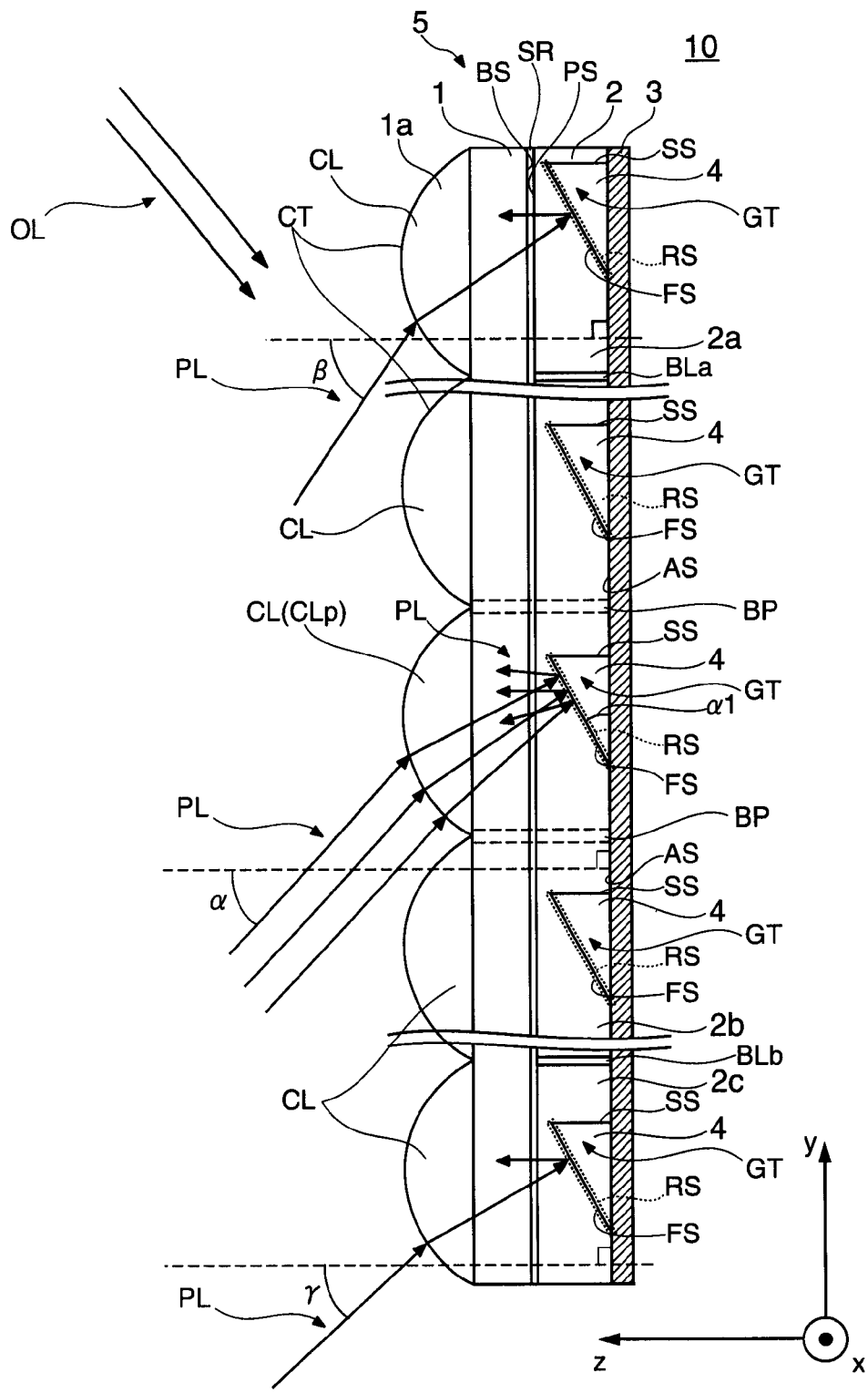
FIG. 2 is a side cross-sectional view schematically showing the screen according to the first embodiment.
Figure 3A:
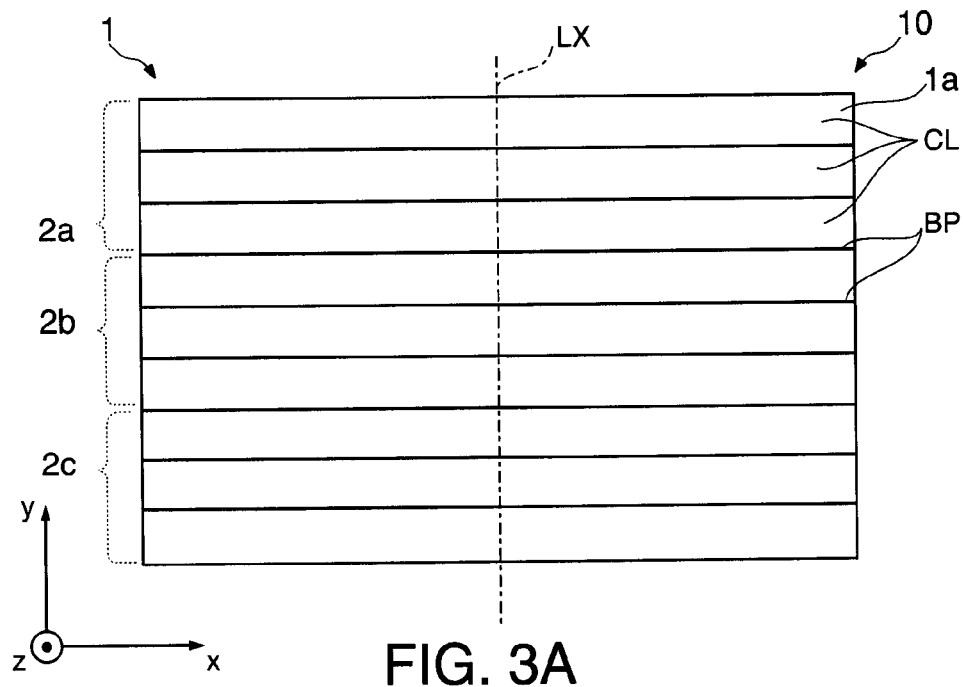
FIGS. 3A and 3B are diagrams for explaining a front surface and a rear surface of the screen.
Figure 3B:
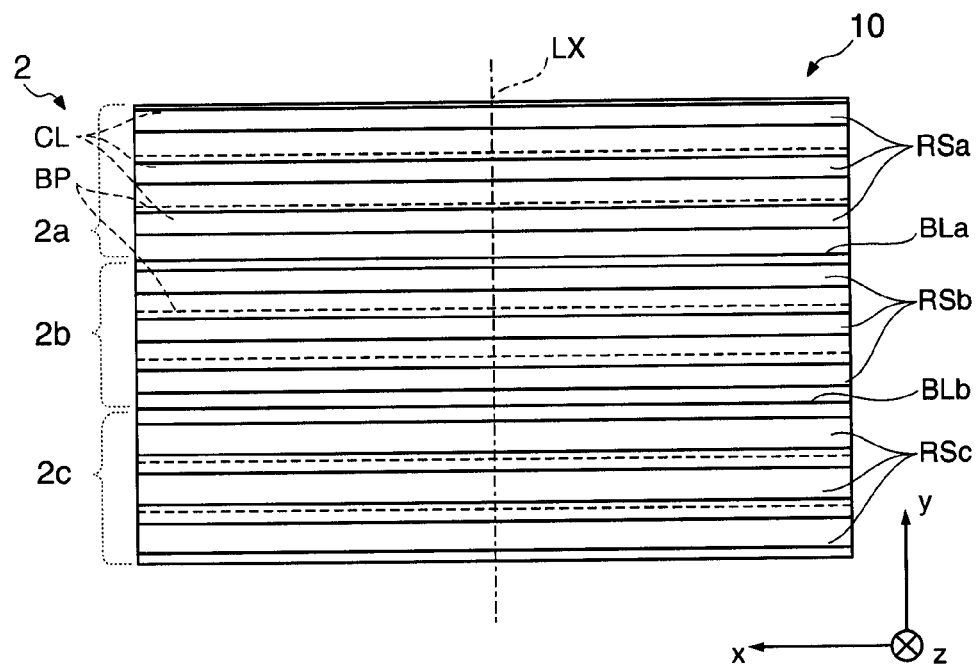

FIG. 2 is a side cross-sectional view schematically showing the structure of the screen 10. Further, FIGS. 3A and 3B are diagrams schematically showing the conditions of the front side and the rear side of the screen 10, respectively. The front surface structure section 1 has a lenticular lens 1a as a lens array having cylindrical lenses CL arranged two-dimensionally on the front side. On the other hand, the rear surface structure section 2 has grooves GT disposed on the rear side of the lenticular lens 1a at intervals corresponding respectively to the cylindrical lenses CL. The rear surface BS of the front surface structure section 1 and the front surface PS of the rear surface structure section 2 are bonded with an adhesive layer SR, thus forming a screen sheet 5. It should be noted that the grooves GT are coated with a scattering material, and thus the rear side of the screen sheet 5 is provided with a scattering section 4.

The lenticular lens 1a formed on the front side of the front surface structure section 1 has a number of cylindrical lenses CL, each of which has a substantially semi-cylindrical outer shape and extends laterally in the x direction, as element lenses arranged side-by-side vertically in the y direction perpendicular to the longitudinal direction (the x direction), thereby forming a surface extending in the x-y plane as a whole. In other words, such cylindrical lenses CL are arranged on a two-dimensional plane so as to form the entire front surface of the screen 10. Each of the cylindrical lenses CL has the projection light PL, which is emitted from the projection lens PO shown in FIG. 1 and directed obliquely upward, input therein and appropriately converge. Further, each of the cylindrical lenses CL emits the projection light PL, which is scattered and reflected by the scattering surface RS described later inside the screen 10, to the front with a predetermined divergence angle.

On the other hand, the grooves GT formed on the rear side of the rear surface structure section 2 extend in correspondence with the cylindrical lenses CL roughly along the longitudinal direction thereof, namely the x direction. Each of the grooves GT is provided with a side surface SS formed on the upper side roughly perpendicularly to a vertical direction, namely the y direction in which the cylindrical lenses CL are arranged, and each of the grooves GT is defined by the side surface SS and a bottom surface FS formed obliquely, thus having a y-z cross-sectional surface shaped like a triangle. The bottom surface FS is tilted with a predetermined tilt angle $\alpha_1$ so as to enhance the tendency of reflecting the projection light PL, which is converged by each of the cylindrical lenses CL and enters obliquely upward, to the front, namely in the +z direction. Each of the scattering sections 4 is for filling the groove GT having the shape described above, and has a shape obtained by reversing the shape of the groove GT. The scattering section 4 makes the incident light from the bottom surface FS become in the state of being scattered with an appropriate dispersion characteristic when reflecting the incident light in the +z direction. Thus, it becomes possible to enhance the effect of guiding the projection light PL, which enters the screen 10 from the lower position adjacent to the screen, to the front with the certain spread. As the scattering component, barium sulfate or a material obtained by mixing white reflective ink (e.g., white pearl like ink) with barium sulfate, for example, can be used. In the above explanations, the bottom surface FS and the thin film section (e.g., a part thereof with a thickness of about several micrometers) of the scattering section 4 adjacent to the back of the bottom surface FS have a function of reflecting the light beam input to the screen 10 to the front while scattering the light beam, and therefore, it is assumed that the bottom surface FS and the thin film section of the scattering section 4 are collectively called a scattering surface RS.

Here, as shown in FIG. 3A among FIGS. 3A and 3B, the front surface structure section 1 forming the front side of the screen 10 is formed integrally. Therefore, the front side of the screen, namely the front side, which the projection light is projected to and faces the observer, has a seamless single sheet structure. In contrast, as shown in FIG. 3B, the rear surface structure section 2 forming the rear side of the screen 10 has the three rectangular rear surface forming sections 2a, 2b, and 2c arranged side-by-side in the vertical direction so as to be joined with each other, thereby covering the entire rear side of the front surface structure section 1, and is provided with seams BLa, BLb extending in the lateral direction. In this case, the seams BLa, BLb extend along the boundaries of the cylindrical lenses CL. On the other hand, the rear surface forming sections 2a, 2b, and 2c do not have a seam in the vertical direction. Further, the light absorption sheet 3 shown in FIG. 2 covers the rear side of the seams BLa, BLb. According to the configuration described above, the seams BLa, BLb become almost inconspicuous. Since the structure described above is adopted, in the case in which the observer views the screen 10 from the front side thereof, the front side of the screen 10 has the seamless single sheet configuration, and the rear side thereof is also arranged so that the areas of the seams BLa, BLb are inconspicuous.

Further, the rear surface forming sections 2a, 2b, and 2c respectively have pluralities of scattering surfaces RSa, RSb, and RSc, and these pluralities of scattering surfaces RSa, RSb, and RSc have shapes including different patterns from each other. In other words, the shapes of the scattering surfaces RSa, RSb, and RSc are varied by the area obtained by separating the rear surface with the rear surface forming sections 2a, 2b, and 2c in accordance with the difference in the incident angle of the projection light PL and so on. Specifically, by varying, for example, the positions of the grooves GT forming each of the scattering surfaces RSa, RSb, and RSc with respect to the cylindrical lenses CL, the sizes of the grooves GT in the y direction, or the tilt angles of the bottom surfaces FS, it is possible to obtain the condition in which the scattering surfaces RS appropriately capture the projection light PL at respective positions of the screen 10, and scatter and reflect the projection light PL.

Going back to FIG. 2, the light absorption sheet 3 is formed so as to cover the entire rear side of the screen sheet 5 with the light absorbing material. The light absorption sheet 3 forms a light absorption surface AS for absorbing unnecessary light such as the outside light in the vicinity of the scattering section 4. It should be noted that the total thickness of the screen 10 is preferably in a range of about 0.3 mm through 0.5 mm.

Hereinafter, the operation in the screen 10 will be explained while explaining the light path of the projection light PL with reference to FIG. 2.

Firstly, the projection light PL input to, for example, the cylindrical lens CLp located at the center thereof with the incident angle α among the five cylindrical lenses CL shown in the drawing is condensed, and then scattered and reflected by the scattering surface RS located behind the cylindrical lens CLp. The projection light PL scattered and reflected by the scattering surface RS is emitted to the front via the same cylindrical lens CLp in an appropriately diffused condition. It should be noted that the scattering surface RS corresponding to the center cylindrical lens CLp included in the rear surface forming section 2b, located at the center thereof with respect to the vertical direction, namely the y direction, among the rear surface forming sections 2a, 2b, and 2c. Similarly, the projection light PL input to each of the cylindrical lenses CL other than the cylindrical lens CLp is also emitted from the same cylindrical lens CL. For example, in the screen 10, the projection light PL input to the cylindrical lens CL on the upper side with the incident angle β larger than the incident angle α is scattered and reflected to the front by the scattering surface RS of the rear surface forming section 2a located on the upper side among the rear surface forming sections 2a, 2b, and 2c. Further, the projection light PL input to the cylindrical lens CL on the lower side with the incident angle γ smaller than the incident angle α is scattered and reflected to the front by the scattering surface RS of the rear surface forming section 2c located on the lower side.

As described above, the incident angle of the projection light PL varies in accordance with the incident position thereof on the screen 10. Therefore, the scattering surfaces RS in the respective rear surface forming sections 2a, 2b, and 2c have different shape patterns from each other so as to appropriately scattering and reflecting the respective projection light PL. There can be cited various shape patterns different from each other in the rear surface forming sections 2a, 2b, and 2c as described above, and specifically, for example, in the case of FIG. 2, the arrangement of the scattering surfaces RS with respect to the cylindrical lenses CL varies in accordance with the incident angles α, β, and χ of the projection light PL. In other words, when comparing the rear surface forming sections 2a, 2b, and 2c with each other, the position of the scattering surface RS in the rear surface forming section 2a located on the upper side is set to the uppermost side, namely the positive side in the y direction, with respect to the corresponding cylindrical lens CL, and in contrast, the position of the scattering surface RS in the rear surface forming section 2c located on the lower side is set to the lowermost side.

It should be noted that when using the screen 10, in many cases, the illumination light causing the outside light OL unnecessary for image projection is implemented on, for example, the ceiling side of the room to illuminate the room. The most part of the outside light OL thus projected from above enters the side surfaces SS of the grooves GT or the light absorption surface AS of the light absorption sheet 3 in the screen 10. The outside light OL input to the side surfaces SS of the grooves GT are, for example, reflected without proceeding towards the front of the screen 10 where the observer is located, and further, the outside light OL input to the light absorption sheet 3 is absorbed also without proceeding towards the front of the screen 10.

Further, on the surface of each of the cylindrical lenses CL forming the surface of the lenticular lens 1a, there is applied an AR coat CT as an antireflection coat. Thus, the reflection of the light is prevented.

Further, the screen 10 is arranged to be roll-windable in a direction of the arrow AW shown in FIG. 1. In this case, the boundary sections BP, which link the cylindrical lenses CL of the lenticular lens 1a, mainly bend, thereby making it possible to roll the screen 10 to be retracted without substantially deforming the cylindrical lenses CL themselves.

Hereinafter, an example of a method of manufacturing the screen 10 according to the present embodiment will be explained. FIGS. 4A, 4B, and 4C are diagrams showing an example of a method of manufacturing the screen sheet 5 of the screen 10. In other words, a process of bonding the front surface structure section 1 and the rear surface forming sections 2a, 2b, and 2c constituting the rear surface structure section 2 with each other will be explained. It should be noted that only the rear surface forming section 2a located in the uppermost section in the y direction among the three rear surface forming sections 2a, 2b, and 2c will be explained, and since the same can apply to the remaining rear surface forming sections, the detailed explanations therefore will be omitted.

Firstly, as shown in FIG. 4A, the front surface structure section 1 and the rear surface forming section 2a constituting the rear surface structure section 2 are prepared. It should be noted that the front surface structure section 1 is formed by, for example, molding a part P1 to form the lenticular lens 1a on one surface of a base film BF1 with the same material as the material of the base film BF1 (a first manufacturing process). Further, in a similar manner, the rear surface forming section 2a is formed by, for example, molding a part P2 to form the grooves GT on one surface of a base film BF2 with the same material as the material of the base film BF2 (a second manufacturing process).

Figure 5:
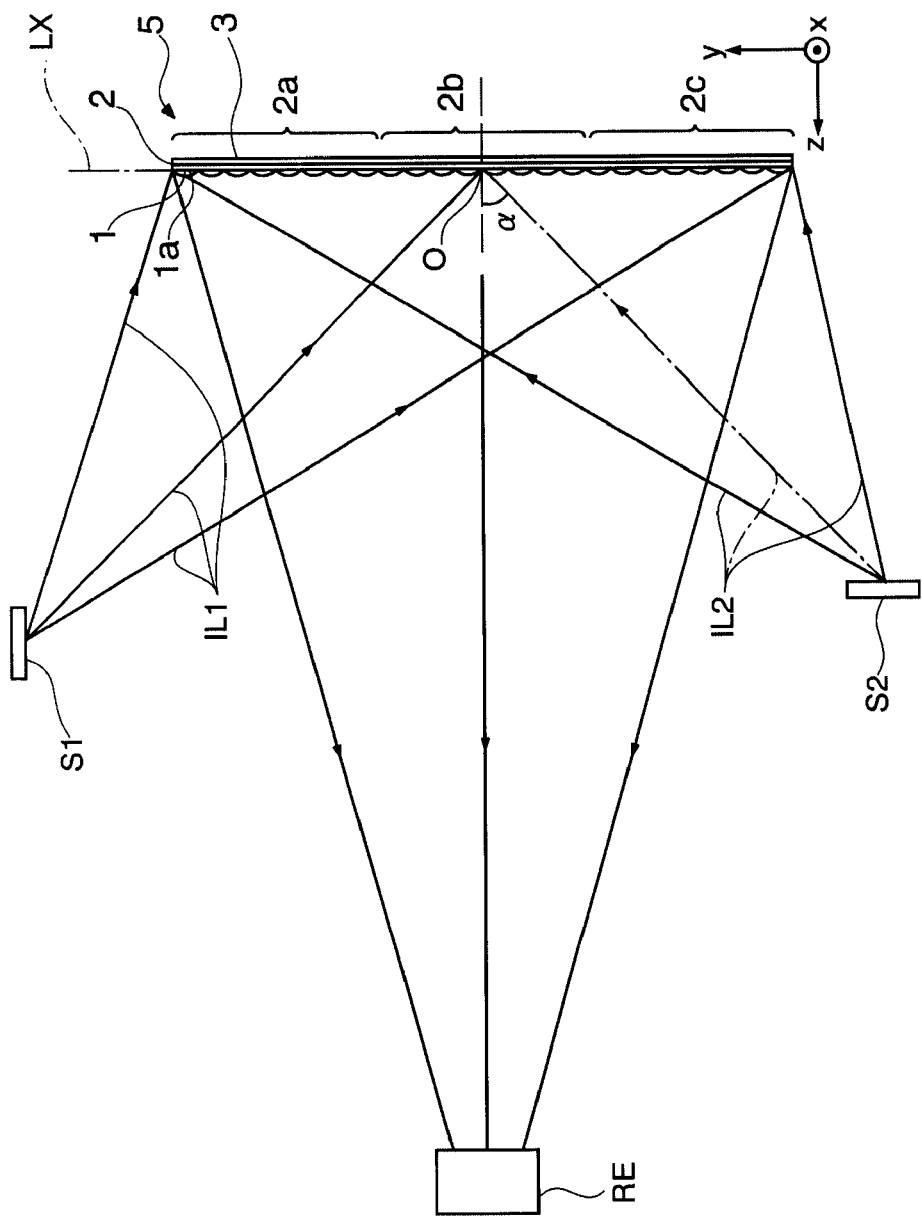
FIG. 5 is a diagram for explaining a part of the screen manufacturing process.

Then, as shown in FIG. 4B, ultraviolet curing resin P3 to form the adhesive layer SR is applied on the rear surface BS of the front surface structure section 1, and the alignment of the rear surface forming section 2a is performed while applying imaginary light beams IL1, IL2. More specifically, firstly, a measuring instrument RE for the reflected light is implemented on the +z side, the positive reflection direction of the light, as shown in FIG. 5. Further, the imaginary light beam IL1 imitating the outside light is emitted from a light source S1. Meanwhile, the imaginary light beam IL2 imitating the projection light is emitted from a light source S2. The measuring instrument RE measures the value of the reflected light of each of these imaginary light beams IL1, IL2. The alignment of the rear surface forming section 2a is performed based on the value measured by the measuring instrument RE. In other words, when emitting the imaginary light beam IL1 from the light source S1, the rear surface forming section 2a is moved on the x-y plane to the position where the value of the reflected light of the imaginary light beam IL1 measured by the measuring instrument RE becomes as small as possible, namely the position where the reflected light becomes as faint as possible. On the other hand, when emitting the imaginary light beam IL2 from the light source S2, the rear surface forming section 2a is moved on the x-y plane to the position where the value of the reflected light of the imaginary light beam IL2 thus measured becomes as large as possible, namely the position where the reflected light becomes as bright as possible. According to the operation described above, the front surface structure section 1 and the rear surface forming section 2a are positioned to each other where the bottom surface FS to form the scattering surface RS and the corresponding cylindrical lens CL have the positional relationship with which the outside light is not reflected as much as possible and the projection light is reflected. In other words, in this case, the positioning is completed when the optimum condition with the contrast as high as possible is obtained.

Lastly, going back to FIG. 4C, the ultraviolet ray UV is applied to cure the ultraviolet curing resin P3 held between the front surface structure section 1 and the rear surface forming section 2a on which the alignment is thus executed. Thus, the adhesive layer SR is formed, and the front surface structure section 1 and the rear surface forming section 2a are bonded to each other. It should be noted that the alignment with the front surface structure section 1 is executed also on each of the other rear surface forming sections 2b, 2c in a similar manner as shown in FIG. 5, and each of the rear surface forming sections 2b, 2c is bonded to the front surface structure section 1. In a manner as described above, the screen sheet 5 is formed, and further, as already described above, the scattering sections 4 and the light absorption sheet 3 are provided to the grooves GT of the screen sheet 5, and the AR coat CT is applied on the surfaces of the cylindrical lenses CL, thereby manufacturing the screen 10.

In the manufacturing method described above, as the imaginary light beams IL1, IL2, visible light beams, for example, are used. Thus, the ultraviolet curing resin P3 to form the adhesive layer SR is not cured during the execution of the alignment, and the ultraviolet ray UV is applied thereon to cure the ultraviolet curing resin P3 after the alignment has been completed, thereby bonding the front surface structure section 1 and the rear surface forming sections 2a, 2b, and 2c to each other. As described above, by performing the alignment based on the imaginary light beams IL1, IL2 assuming the light caused when using the screen such as the projection light PL from a projection device such as a projector, or the outside light OL as unnecessary light, and forming the screen sheet 5 after the alignment has been completed, it becomes possible to position the scattering surfaces RS corresponding respectively to the cylindrical lenses CL so as to obtain the optimum contrast. It should be noted that although in this case, there is a possibility that the alignment causes a gap in the area of each of the seams BLa, BLb shown in FIG. 2 or FIGS. 3A and 3B, since the seams BLa, BLb are arranged to run along the boundaries of the cylindrical lenses CL as described above, and further, the light absorption sheet 3 is provided on the rear side of the seams BLa, BLb, if there are caused some gaps in the seams BLa, BLb, such gaps are inconspicuous.

Since the screen 10 according to the present embodiment is manufactured using the method described above, the screen 10 according to the present embodiment is capable of reducing the influence of the outside light to improve the contrast of the projection image in a bright room or the like, and further appropriately reflecting and scattering the projection light with a substantial incident angle frontward while being manufactured with relative ease and low cost.

Figure 6A:
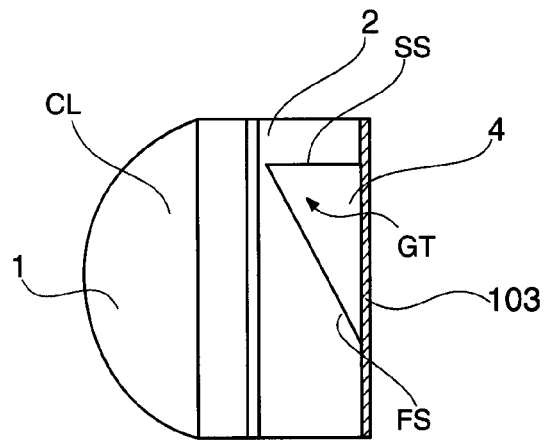
FIGS. 6A through 6C are diagrams for explaining other methods of manufacturing the screen.
Figure 6B:
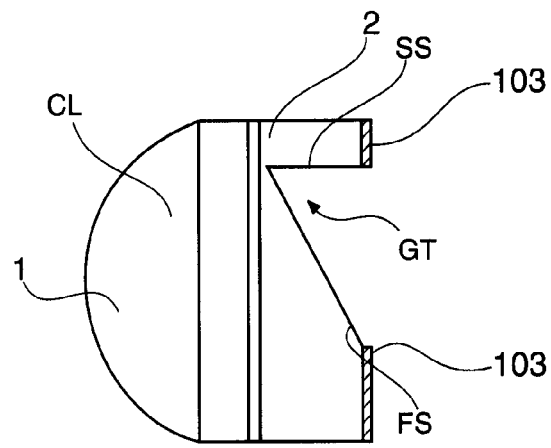
Figure 6C:
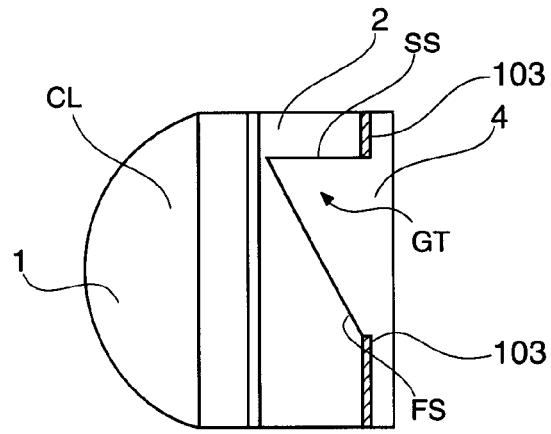

FIGS. 6A, 6B, and 6C are diagrams for explaining modified examples of a method of manufacturing the screen according to the present embodiment, and each of the drawings is a side cross-sectional view schematically showing an area corresponding to one cylindrical lens CL, namely an area corresponding to one pitch of the screen 10. It should be noted that the manufacturing method of the screen sheet 5 is substantially the same as in the example described above, and therefore, the explanations therefore will be omitted. Firstly, in an example shown in FIG. 6A among FIGS. 6A, 6B, and 6C, a light absorption film 103 is formed instead of the light absorption sheet 3 shown in FIG. 2. Specifically, the light absorption film 103 is formed by applying the light absorbing ink so as to cover the entire rear side of the screen sheet 5 after forming the scattering section 4 by filling the groove GT with the scattering material applied to the groove GT. FIGS. 6B and 6C show still another manufacturing method in stages. In the present modified example, as shown in FIG. 6B, firstly the light absorbing ink is applied on the rear side of the screen sheet 5 before the scattering section 4 is applied, and then the light absorption film 103 having an opening at the position of the groove GT. Then, as shown in FIG. 6C, the scattering material is applied on the entire rear side of the screen sheet 5 so as to fill the groove GT, thus forming the scattering section 4. It should be noted that the descriptions of the manufacturing methods are nothing more than exemplifications, and therefore, other manufacturing methods can also be adopted providing substantially the same structures can be obtained.

Further, the scattering section 4 is only required to provide a scattering effect as the scattering surface RS, and it is not required to completely fill the grooves GT with the scattering material. Therefore, it is possible, for example, to form the scattering surface RS by applying the scattering material only on the bottom surface FS out of the groove GT as the scattering section 4. Further, it is also possible to form the scattering surface RS by, for example, forming an uneven surface randomly on the bottom surface FS to provide the scattering effect instead of using the scattering material.

Second Embodiment

Figure 7A:
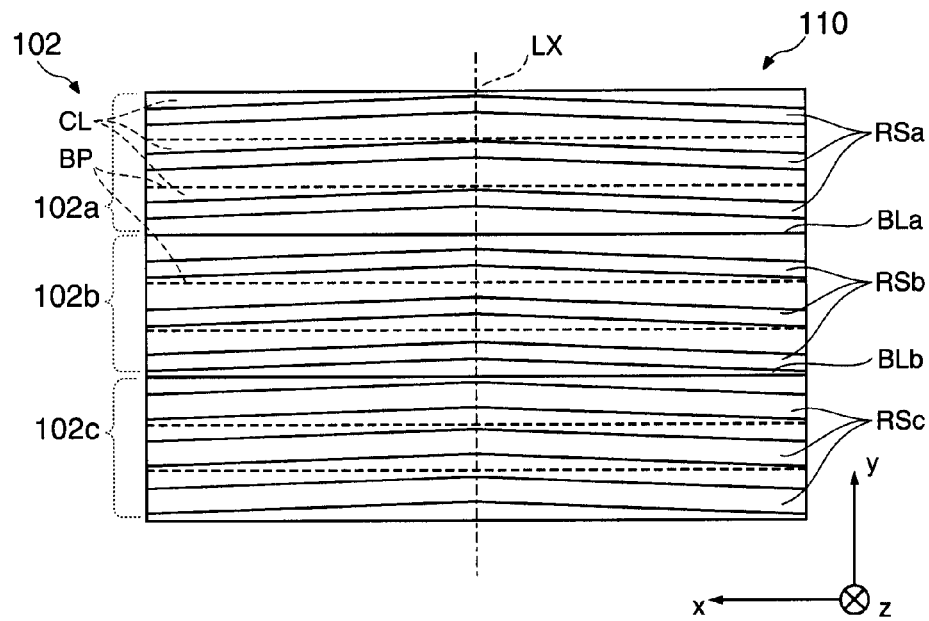
FIGS. 7A and 7B are diagrams for explaining a screen according to a second embodiment.
Figure 7B:
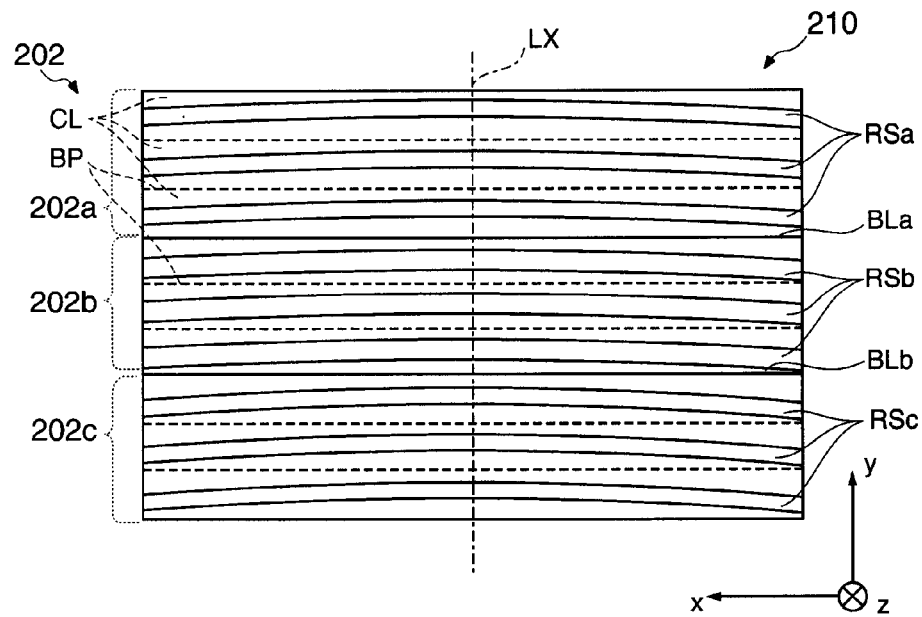

FIGS. 7A and 7B are side views schematically showing a screen according to a second embodiment. It should be noted that the present embodiment is the same as the first embodiment except the shapes of the scattering surfaces RS in the rear side of the screens 110, 210 respectively shown in FIGS. 7A and 7B, and therefore, the explanations for the other sections will be omitted.

Firstly, the screen 110 shown in FIG. 7A will be explained. In the screen 110, the pluralities of scattering surfaces RSa, RSb, and RSc in the respective rear surface forming sections 102a, 102b, and 102c each extend roughly along the longitudinal direction of the corresponding cylindrical lenses CL, namely roughly along the x direction, but are not completely parallel to the x direction, and extend linearly from the screen center axis LX, which is near to the center of the screen 110, towards both of the peripheral areas in the lateral direction symmetrically and obliquely downward. Thus, each of the scattering surfaces RSa, RSb, and RSc is arranged so that the position of the scattering surface is shifted from the center position of the corresponding cylindrical lens CL in the −y direction, namely towards the side, in which the incident angle of the projection light PL to the x-y plane becomes small, as the position moves away from the center position of the corresponding cylindrical lens CL along the longitudinal direction towards either of the ends. Generally, in comparison of the optical paths of the projection light PL input to the screen 110 between in the vicinity of the center and in the peripheral areas inside each of the cylindrical lenses CL, the projection light PL input in the peripheral areas traces the light path getting more deeply into the lower side, namely in the −y direction, than the projection light PL input in the vicinity of the center thereof. In the screen 110 of the present embodiment, in accordance with the position of the projection light PL being shifted downward as getting away towards the peripheral areas, the position of each of the scattering surfaces RSa, RSb, and RSc is shifted downward as getting away towards the peripheral areas. In the respective rear surface forming sections 102a, 102b, and 102c, by thus adjusting the amount of shift of each of the scattering surfaces RSa, RSb, and RSc in the −y direction in accordance with the incident angle of the projection light PL input to each of the scattering surfaces, it becomes possible to appropriately scatter and reflect the projection light PL frontward while preventing the light absorption surface AS from absorbing the component of the projection light PL to be scattered and reflected even in the peripheral areas.

Then, the screen 210 shown in FIG. 7B will be explained. In the screen 210, the pluralities of scattering surfaces RSa, RSb, and RSc in the respective rear surface forming sections 202a, 202b, and 202c extend roughly along the longitudinal direction of the corresponding cylindrical lenses CL, namely the x direction, but either of them is formed to have a curved shape convex upward and bilaterally symmetric with respect to the center axis LX. In other words, in this case, the vertical position, namely the position in the y direction of each of the pluralities of the scattering surfaces RSa, RSb, and RSc varies gradually in accordance with the light path of the projection light PL input to the screen 210. Thus, the reflection of the projection light PL by the scattering surface RS can be made more suitable.

It should be noted that besides the examples described above, the arrangement of the scattering surfaces RSa, RSb, and RSc can be made suitable for the reflection of the projection light PL by varying the shape of each of the pluralities of the scattering surfaces RSa, RSb, and RSc in a staircase pattern bilaterally symmetric with respect to the canter axis LX.

Third Embodiment

Figure 8:
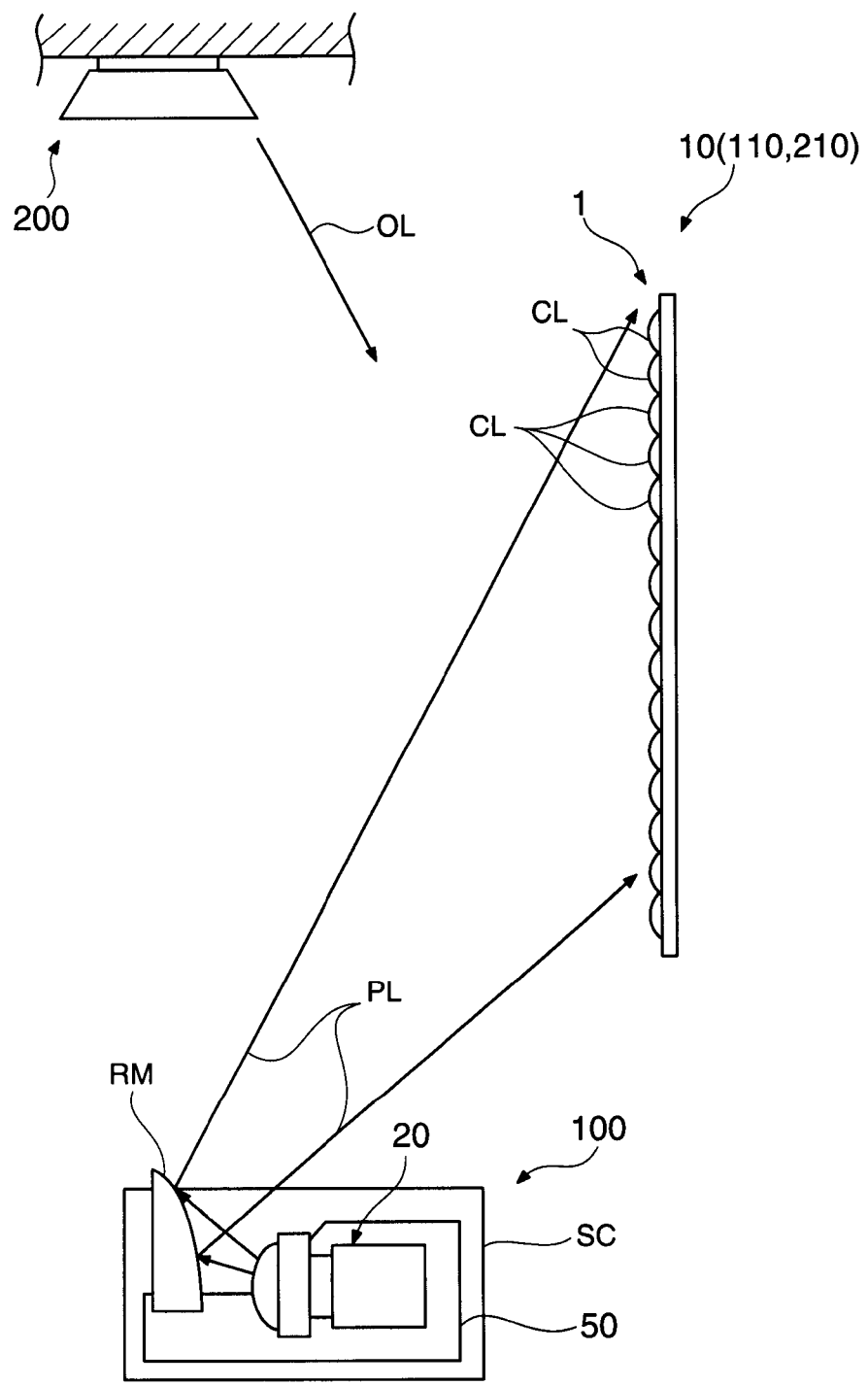
FIG. 8 is a schematic diagram of a projection system according to a third embodiment.

FIG. 8 is a diagram showing an example of a projection system according to a third embodiment, and shows the projection system in the case of using any one of the screens 10, 110, and 210 of the first and second embodiments, and a projector as the image projection device. In FIG. 8, the projector 100 is provided with a projector main body 50, a projection lens 20, and a reflecting mirror RM. It should be noted that each of the mechanisms of the projector 100 is housed in the housing SC. Further, it is assumed here that in the installation environment of the screen 10, 110, or 210, and the projector 100, an illumination device 200 suspended from the ceiling of the room provides illumination with the outside light OL from above, and the projector 100 performs projection from a lower side of the screen 10, 110, or 210.

The image light formed by the control in the projector 50 is emitted from the projection lens 20, and further reflected by the reflecting mirror RM, thus emitted as the projection light PL from the projector 100 in a condition of being provided with a desired angle. Therefore, in this case, the projector 100 performs the oblique projection with the light beam axis of the projection light PL tilted with respect to the normal line of the screen 10, 110, or 210. The projection light PL projected to the screen 10, 110, or 210 is reflected on the screen 10, 110, or 210 frontward with an appropriate divergence angle. On this occasion, as described above, since the screens 10, 110, and 210 are configured in accordance with the projection angle of the projection light PL, it is possible not only to reduce the influence of the outside light OL to the image projected, thus improving the contrast of the projected image in a bright room or the like, but also to appropriately emit the projection light PL frontward.

It should be noted that the invention is not limited to the embodiments described above, but can be put into practice in various forms within the scope or the spirit of the invention, and the following modifications, for example, are also possible.

Firstly, although in the embodiments described above the three rear surface forming sections 2a, 2b, and 2c are separately be provided, the number of rear surface forming sections is not limited thereto, but can be increased, for example, in accordance with the difference in the incident angle of the projection light PL. Further, although the seams BLa, BLb of the rear surface forming sections 2a, 2b, and 2c are arranged to be disposed in a lateral direction, and in particular, along the boundaries of the cylindrical lenses CL, it is possible to provide an additional seam providing the seam is inconspicuous to the observer of the screen 10, and it is also possible to form the rear surface forming sections in the form of, for example, three-by-three arrays, totally nine blocks.

Further, although in the embodiments described above, the lens array is formed of the lenticular lens 1a, the lens array in the screen 10, 110, and 210 can be formed by, for example, arranging microlenses on a two-dimensional plane instead of these configurations. On this occasion, the vertical cross-sectional surface of the microlenses becomes what is shown in FIG. 2.

Further, although in the embodiments described above, the scattering sections 4 are formed by applying the ink containing the scattering component, the scattering sections 4 can be formed by attaching, for example, scattering sheets to the scattering surfaces RS instead of applying the ink.

Further, although the light absorption sheet 3 is arranged to cover the entire rear side of the lenticular lens 1a, it is also possible to provide the light absorption sheet 3 according to need. For example, it is possible to provide the light absorption sheet 3 partially to the peripheral area of the bottom surface FS coated with the scattering section 4 or the seams BLa, BLb of the rear surface forming sections 2a, 2b, and 2c in order for improving the contrast.

Further, although the cross-sectional shape of each of the cylindrical lenses CL is arranged to have a substantially circular shape, the shape is not limited thereto, but can be a noncircular shape.

Further, although in each of the cylindrical lenses CL, input and output of the projection light PL are performed in the same cylindrical lens CL, the type of scattering and reflection of the projection light PL is not limited thereto, but it is possible to adopt the type of emitting the projection light PL from the cylindrical lens CL adjacent to the cylindrical lens CL to which the projection light PL is input.

Although in the embodiments described above, the direction of the light beam axis AX with respect to the projection light PL is arranged to be a direction from a lower position taking the typical use environment of the projection device or the like into consideration, and the shape of the bottom surface FS and so on are configured, it is also possible in the case in which the projection light PL is input from a position other than the lower position to modify the configuration of the scattering surface RS in accordance with the direction of the projection light PL. In other words, in the case in which the projection from the projector is performed in the lateral side of the screen, it is possible to modify the tilt angle and so on of the scattering surface RS in accordance with the incident direction of the projection light PL.

The entire disclosure of Japanese Patent Application No. 2008-54463, filed Mar. 5, 2008 is expressly incorporated by reference herein.

What is claimed is:

1. A screen comprising:
    a front surface structure section including a lens array having a plurality of element lenses arranged on a two-dimensional plane on a front side of the screen;
    a rear surface structure section including a plurality of scattering surfaces formed on a rear side of the lens array so as to be tilted with respect to the two-dimensional plane, and adapted to emit projection light, which has been input, towards the front side of the screen while scattering the projection light; and
    an adhesive layer adapted to bond the front surface structure section and the rear surface structure section to each other,
    wherein the rear surface structure section is composed mainly of a plurality of rear surface forming sections different from each other in a pattern of the plurality of scattering surfaces.

2. The screen according to claim 1, wherein
    the front surface structure section is an integral molding component.

3. The screen according to claim 1, wherein the adhesive layer is made of ultraviolet curing resin.

4. The screen according to claim 1, wherein the lens array includes a plurality of cylindrical lenses as the plurality of element lenses, and is formed of a lenticular lens having the plurality of cylindrical lenses arranged in a direction perpendicular to a longitudinal direction of each of the cylindrical lenses.

5. The screen according to claim 4, wherein the plurality of rear surface forming sections is arranged so as to be joined with each other to cover a rear side of the front surface structure section, and a seam of the plurality of rear surface forming sections extends along a longitudinal direction of the plurality of cylindrical lenses.

6. The screen according to claim 4, wherein the lenticular lens is arranged to be roll-windable, and has a structure of arranging the plurality of cylindrical lenses so as to have a longitudinal direction along a direction of an axis around which the lenticular lens is rolled.

7. The screen according to claim 1, further comprising: a light absorption surface made of a light absorbing material disposed at least in a peripheral area of the scattering surface in a rear side of the rear surface structure section.

8. The screen according to claim 1, wherein the lens array has an antireflection coat on a front surface of the lens array.

9. A projection system comprising:
the screen according to claim 1; and
an image projection device adapted to project a projection image on the screen.

10. A method of manufacturing a screen comprising:
(a) forming a front surface structure section including a lens array having a plurality of element lenses arranged on a two-dimensional plane on a front side of the screen;
(b) forming a plurality of rear surface forming sections each including a plurality of scattering surfaces formed on a rear side of the lens array so as to be tilted with respect to the two-dimensional plane, and adapted to emit projection light, which has been input, towards the front side of the screen while scattering the projection light; and
(c) bonding the front surface structure section formed in step (a) and the plurality of rear surface forming sections formed in step (b) to each other,
wherein patterns of the plurality of scattering surfaces are different between the rear surface forming sections.

11. The method of manufacturing a screen according to claim 10, wherein
in step (a), the front surface structure section is formed as an integral molding component.

12. The method of manufacturing a screen according to claim 10, wherein
in step (c), positioning of the plurality of scattering surfaces corresponding to the plurality of element lenses is performed while applying imaginary light, which corresponds to light applied to the screen in actual use, from a front side of the front surface structure section, thereby performing an alignment of the plurality of rear surface forming sections, and then the plurality of rear surface forming sections is fixed to the front surface structure section.

13. The method of manufacturing a screen according to claim 10, wherein
in step (c), an ultraviolet curing resin is held between the front surface structure section and the plurality of rear surface forming sections, and then an ultraviolet ray is applied to the ultraviolet curing resin, thereby bonding the front surface structure section and the plurality of rear surface forming sections to each other.

* * * * *